US010191993B2

(12) United States Patent
Ross et al.

(10) Patent No.: US 10,191,993 B2
(45) Date of Patent: Jan. 29, 2019

(54) NETWORK BASED SWEEPSTAKES GAMING SYSTEM INCORPORATING AN ALTERNATIVE METHOD OF CONTESTANT ENTRY

(71) Applicant: SCA Promotions, Dallas, TX (US)

(72) Inventors: Jay B. Ross, Lambertville, NJ (US); Anthony James Ebert, Addison, TX (US); Robert D. Hamman, Dallas, TX (US); William Carey Kennedy, Dallas, TX (US); Robert McKee, Fort Worth, TX (US)

(73) Assignee: SCA PROMOTIONS, Dallas, TX (US)

( * ) Notice: Subject to any disclaimer, the term of this patent is extended or adjusted under 35 U.S.C. 154(b) by 45 days.

(21) Appl. No.: 15/198,580

(22) Filed: Jun. 30, 2016

(65) Prior Publication Data
US 2017/0351777 A1    Dec. 7, 2017

Related U.S. Application Data

(60) Provisional application No. 62/392,436, filed on Jun. 1, 2016.

(51) Int. Cl.
*G07F 17/32* (2006.01)
*G06Q 20/38* (2012.01)
(Continued)

(52) U.S. Cl.
CPC ..... *G06F 17/30879* (2013.01); *G06Q 20/385* (2013.01); *G07F 17/329* (2013.01);
(Continued)

(58) Field of Classification Search
CPC ............... G07F 17/329; G07F 17/3218; G07F 17/3255; G06Q 20/385; G06Q 30/0209; A63F 3/0645; G06F 17/30879
See application file for complete search history.

(56) References Cited

U.S. PATENT DOCUMENTS 7,357,715 B2 * 4/2008 Kane ...................... G07F 17/32
                                                                273/138.1
7,854,653 B2 * 12/2010 Kane ...................... A63F 13/12
                                                                463/9

(Continued)

*Primary Examiner* — William H McCulloch, Jr.
(74) *Attorney, Agent, or Firm* — Meagher Emanuel Laks Goldberg & Liao, LLP

(57) ABSTRACT

According to some embodiments, a computer based and web enabled sweepstakes system that utilizes automation methods and tools to define a sweepstakes specification and to download the specification to one or more internet based web servers is disclosed. The web servers will permit a sweepstakes contestant to enter personal information into a sweepstakes central database using a web page entry form. The web server will provide the contestant with a printable document. The contestant will send the printed document to a centralized processing center by way of a publically available delivery service. Once received at the processing center, the contestant's unique OMR code found on the printed document is optically scanned and compared to information in the web server contestant data base. If the OMR code is found in the data base a match status flag is set within the contestants' record. Once the match status flag is set the contestant may check the sweepstakes web site to see if he or she is an instant or scheduled winner.

20 Claims, 21 Drawing Sheets

(51) Int. Cl.
*G06F 17/30* (2006.01)
*G06Q 30/02* (2012.01)
*A63F 3/06* (2006.01)

(52) U.S. Cl.
CPC ........ *A63F 3/0645* (2013.01); *G06Q 30/0209* (2013.01); *G06Q 2220/00* (2013.01); *G07F 17/3218* (2013.01); *G07F 17/3225* (2013.01); *G07F 17/3255* (2013.01)

(56) References Cited

U.S. PATENT DOCUMENTS

| | | | | |
|---|---|---|---|---|
| 7,878,900 B2* | 2/2011 | Lind | ................ | G07F 17/32 463/19 |
| 8,413,884 B2* | 4/2013 | Lim | ................ | G06F 17/30879 235/375 |
| 8,529,351 B2* | 9/2013 | Kane | ................ | A63F 13/12 463/16 |
| 8,573,475 B2* | 11/2013 | Zuleeg | ................ | G06F 15/173 235/375 |
| 8,696,433 B2* | 4/2014 | Weller | ................ | G06Q 30/02 463/18 |
| 8,701,977 B2* | 4/2014 | Spaulding | ................ | B65D 27/04 229/300 |
| 8,827,790 B2* | 9/2014 | Weller | ................ | G06Q 30/02 463/16 |
| 8,870,084 B2* | 10/2014 | Hamman | ................ | H04L 9/0866 235/380 |
| 9,224,157 B2* | 12/2015 | Lim | ................ | G06Q 30/0252 |
| 9,826,049 B2* | 11/2017 | Lim | ................ | H04L 67/18 |
| 10,009,180 B2* | 6/2018 | Hamman | ................ | H04L 9/3247 |
| 10,027,487 B2* | 7/2018 | Hamman | ................ | H04L 9/3247 |
| 2002/0028708 A1* | 3/2002 | Busch | ................ | G06Q 20/206 463/42 |
| 2005/0116411 A1* | 6/2005 | Herrmann | ................ | G06Q 20/22 273/146 |
| 2005/0282624 A1* | 12/2005 | Kane | ................ | A63F 13/12 463/25 |
| 2007/0038466 A1* | 2/2007 | Lind | ................ | G06Q 10/00 705/1.1 |
| 2007/0135209 A1* | 6/2007 | Lind | ................ | G07F 17/32 463/25 |
| 2007/0155468 A1* | 7/2007 | Olmstead | ................ | G06Q 30/02 463/17 |
| 2008/0048044 A1* | 2/2008 | Zhao | ................ | G06K 7/14 235/494 |
| 2009/0018942 A1* | 1/2009 | Hamman | ................ | G06Q 30/08 705/37 |
| 2009/0069075 A1* | 3/2009 | Silvestro | ................ | G07F 17/32 463/25 |
| 2009/0117997 A1* | 5/2009 | Oram | ................ | G06Q 20/3674 463/25 |
| 2011/0165933 A1* | 7/2011 | Guziel | ................ | A63F 3/0645 463/17 |
| 2012/0029998 A1* | 2/2012 | Aversano | ................ | G06Q 30/00 705/14.27 |
| 2012/0095819 A1* | 4/2012 | Li | ................ | G06Q 30/02 705/14.23 |
| 2012/0181330 A1* | 7/2012 | Kim | ................ | G06Q 30/02 235/375 |
| 2013/0110607 A1* | 5/2013 | Basmajian | ................ | G06Q 30/0238 705/14.26 |
| 2013/0331178 A1* | 12/2013 | Mosley | ................ | G07F 17/329 463/26 |
| 2013/0346170 A1* | 12/2013 | Epstein | ................ | G06Q 30/02 705/14.14 |
| 2014/0025507 A1* | 1/2014 | Rogener | ................ | G06Q 30/0269 705/14.66 |
| 2014/0351031 A1* | 11/2014 | Randel | ................ | G06Q 30/0212 705/14.14 |
| 2014/0358690 A1* | 12/2014 | Mueller | ................ | G06Q 30/0267 705/14.64 |
| 2015/0108211 A1* | 4/2015 | Higgins | ................ | G06K 5/00 235/375 |
| 2017/0351777 A1* | 12/2017 | Ross | ................ | G06F 17/30879 |

* cited by examiner

HUNT BROTHERS PIZZA - MOW LIKE A PRO SWEEPSTAKES - CODE NEEDED

Prize Details

- One (1) Grand Prize: Exmark Lazer Z XSeries Zero-Turn lawnmower. Winner must take delivery of prize from an authorized dealership designated by Sponsor. Approximate retail value of First Prize is $12,000.
- One (1) First Prize: Exmark Pioneer S-Series lawnmower. Winner must take delivery of prize from an authorized dealership designated by Sponsor. Approximate retail value of First Prize is $7,000.
- One (1) Second Prize: Exmark Quest Front Steer lawnmower. Winner must take delivery of prize from an authorized dealership designated by Sponsor. Approximate retail value of Second Prize is $5,000.
- Three (3) Third Prizes: Each Third Prize is one (1) Exmark Commercial 30" Walk- Behind lawnmower. Winner must take delivery of prize from an authorized dealership designated by Sponsor. Approximate retail value of each Third Prize is $1,800.
- One-Hundred (100) Fourth Prizes: Exmark-branded safety/sun glasses. Approximate retail value of each Fourth Prize is $50.
- One-Hundred (100) Fifth Prizes: Exmark branded work gloves. Approximate retail value of each Fifth Prize is $20.
- Approximate retail value of all available prizes is $36,400.

Rules

- Open to legal residents of the forty-eight Continental United States and the District of Columbia who are eighteen (18) years of age or older or of the age of majority in their state of residence, whichever is older on the date of Sweepstakes entry.

Review and Additional Information

- How To Participate: Find "Mow Like a Pro" (The "Sweepstakes") promotion stickers containing Promotion Codes affixed to specially-marked retail packages of Hunt Brothers Pizza products from January 22, 2015 through April 30, 2015, or while supplies last, whichever occurs first. Each "Mow Like a Pro" promotion sticker has a promotion code ("Promotion Code") printed on it which is good for one (1) entry.
- NO PURCHASE NECESSARY: Promotion sticker also available via free mail-in request – limit one (1) free promotion sticker request per outer stamped mailing envelope – by sending a Self-Addressed Stamped Envelope to "Mow Like a Pro Promotion Sticker Request," PO Box 11449, Bozeman, MT 59719-1449 postmarked by April 30, 2015 and received by May 7, 2015. Residents of VT may omit return postage.

<center>Figure 1<br>(Prior Art)</center>

Save File: 
Entity ID #: 
Sweepstakes #: 
Sweepstakes Name: 
Webpage Specification File: 
OMR Code Type: 
Captcha Active: 
Email Validation Verbiage File: 
Database File Name: 
Contest Rules File Name: 
Mail To (Line 1): 
Mail To (Line 2): 
Mail To (Line 3): 
Mail To (Line 4): 
Sweepstakes Start Date: 
Sweepstakes End Date: 
Must Be Postmarked By: 
Unique URL: 
Win Type: 
Post Draw Date: 
Post Draw Time: 
Entry Time Restriction: [ ] Days [ ] Hours [ ] Minutes
Opt-in Verbiage File Name: 
Offset Number: 
Encryption Key:

— 73

Load — 74

Save — 75

Figure 5

| Code | Type | Description |
|------|------|-------------|
| 00 | 1D | no checksum |
| 01 | 1D | checksum |
| 02 | 2D | no checksum, no ECC |
| 03 | 2D | checksum, ECC |
Figure 6
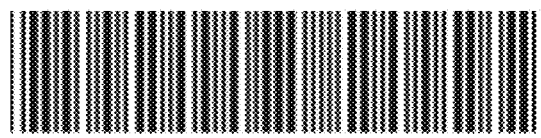
Figure 7
Figure 8

| Database Table Definition:Sweepstakes Specification ||||
|---|---|---|---|
| Number | Field Name | Type | Size |
| 1 | SweepstakesID | ASCII | 5 |
| 2 | SponserName | Text | 64 |
| 3 | SweepstakesName | Text | 64 |
| 4 | SaveFileName | Text | 32 |
| 5 | WebpageFileName | Text | 32 |
| 6 | ValidationEmailVerbiageFileName | Text | 32 |
| 7 | DatabaseFileName | Text | 32 |
| 8 | ContestRulesFileName | Text | 32 |
| 9 | OptInVerbiageFileName | Text | 32 |
| 10 | MailTo_Line1 | Text | 16 |
| 11 | MailTo_Line2 | Text | 16 |
| 12 | MailTo_Line3 | Text | 16 |
| 13 | MailTo_Line4 | Text | 16 |
| 14 | OMRTypeCode | Numeric | 2 |
| 15 | CaptchaActive | Binary | 16 |
| 16 | OffsetNumber | Numeric | 64 |
| 17 | EncryptionKey | Alpha | 64 |
| 18 | UniqueURL_Key | Text | 64 |
| 19 | StartDate | Date | 6 |
| 20 | EndDate | Date | 6 |
| 21 | PostmarkDate | Date | 6 |
| 22 | WinType | Numeric | 2 |
| 23 | PostDrawDate | Date | 6 |
| 24 | PostDrawTime | Time | 6 |
| 25 | EntryRestrictionDay | Numeric | 4 |
| 26 | EntryRestrictionHour | Numeric | 2 |
| 27 | EntryRestrictionMinute | Numeric | 2 |
| 28 | RecordCreateDate | Date | 6 |
| 29 | RecordCreateTime | Time | 6 |
| 30 | CurrentIndexValue | Numeric | 9 |

Figure 9

Database Table Definition: Contestant Data

| Number | Field Name | Type | Size |
|---|---|---|---|
| 1 | ContestantID | ASCII | 5 |
| 2 | SweepstakesID | ASCII | 5 |
| 3 | FirstName | Text | 32 |
| 4 | LastName | Text | 32 |
| 5 | MiddleInitial | Text | 1 |
| 6 | Address_1 | Text | 32 |
| 7 | Address_2 | Text | 32 |
| 8 | City | Text | 32 |
| 9 | State | Text | 2 |
| 10 | Zip | Numeric | 5 |
| 11 | Email | Text | 32 |
| 12 | HomePhone | Numeric | 10 |
| 13 | CellPhone | Numeric | 10 |
| 14 | DateOfBirth | Date | 6 |
| 15 | OptIn | Boolean | 1 |
| 16 | RecordCreatedDate | Date | 6 |
| 17 | RecordCreatedTime | Time | 6 |
| 18 | PostCardReceived | Boolean | 1 |
| 19 | PostCardReceivedDate | Date | 6 |
| 20 | DataVerified | Boolean | 1 |
| 21 | EntryValidated | Boolean | 1 |
| 22 | EntryReceiptSent | Boolean | 1 |
| 23 | GamePlayed | Boolean | 1 |
| 24 | PrizeWon | Numeric | 4 |
| 25 | PrizeWonDescription | Text | 64 |
| 26 | VerificationString | Text | 128 |

Figure 11

XYZ Promotional Drawing

Drawing will occur on December 12, 2016
at 8:00 pm EST

**Enter the reference number issued
to you to view drawing results**

☐☐☐  ☐☐☐  ☐☐☐

Submit

Figure 21

XYZ Promotional Drawing

Drawing will occur on December 12, 2016
at 8:00 pm EST

**Enter the reference number issued
to you to view drawing results**

| 1 | 3 | 1 |   | 5 | 8 | 3 |   | 0 | 6 | 2 |

**Sorry. We do not recognize your reference
number. Please check the number and try again.**

Figure 22

XYZ Promotional Drawing

Drawing will occur on December 12, 2016
at 8:00 pm EST

**Enter the reference number issued
to you to view drawing results**

| 1 | 2 | 1 |   | 5 | 8 | 3 |   | 0 | 6 | 2 |

**Sorry. The drawing for this promotion
has not yet occurred. Please try again
after the date listed above.**

Figure 23

XYZ Promotional Drawing

Drawing will occur on December 12, 2016
at 8:00 pm EST

**Enter the reference number issued
to you to view drawing results**

| 1 | 2 | 1 |   | 5 | 8 | 3 |   | 0 | 6 | 2 |

Sorry. You are not a winner.

Figure 24

XYZ Promotional Drawing

Drawing will occur on December 12, 2016
at 8:00 pm EST

**Enter the reference number issued
to you to view drawing results**

| 1 | 2 | 1 |    | 5 | 8 | 3 |    | 0 | 6 | 2 |

Congratulations, you are a winner!!
A representative will contact you shortly.

Figure 25

NETWORK BASED SWEEPSTAKES GAMING SYSTEM INCORPORATING AN ALTERNATIVE METHOD OF CONTESTANT ENTRY

CROSS-REFERENCE TO RELATED APPLICATIONS

This application claims priority to provisional application 62/392,436, filed on Jun. 1, 2016, which is herein incorporated by reference in its entirety.

BACKGROUND OF THE INVENTION

The present invention relates to systems, methods and apparatus to provide for improvements on network-based sweepstakes promotions.

Sweepstakes and contests have been around since at least the 15th century. The term "sweepstakes" was a reference to a common medieval game where everyone placed in a "stake" and the winner "swept," or won, all the stakes. The term "sweepstakes" has become a generic term for any activity in which one or more winners win a prize. The advent of the modern sweepstakes contest occurred during the 1950's.

Advertisers began to realize that a free prize could play a major role in advertising for a specific consumer product. By offering a chance to win a prize associated with a product for free, customers became more interested in that particular product. They would also be more likely to remember and purchase the product in the future. It was discovered that sweepstakes were often cheaper than running a traditional advertising campaign. In the early days of modern sweepstakes a customer would often purchase more products in order to submit entries to "win".

The terms sweepstakes and contest are often used interchangeably. There is however a technical difference. Sweepstakes are prize giveaways where the winners are chosen by some random variable. Contests are giveaways that have some element of merit or skill such as the best recipe for apple pie or the most beautiful photograph. Another key differentiator between sweepstakes and contests is the fact that to enter a sweepstakes a person does not have to purchase a product by law; where as in a contest it is legal to charge a contestant a fee, due to the fact that there is some element of merit or skill.

Modern sweepstakes law requires that a "no purchase necessary" clause must be in place to enter or win. Most sweepstakes do require a contestant to send in by mail a coupon or post card to enter the sweepstakes. It is usually the case that a contestant can enter as many times as they like within the time limit for entry. The mailed entries require the sweepstakes provider to perform labor intensive manual processing of the entries.

Typically the entries are entered into a computer database. The database information is considered quite valuable in that the contestant entries represent potential customers for future direct marketing of consumer products that the contestant might be interested in.

Key to making the "playing field" level for all contestants is the requirement that some document must be sent by mail to a central processing center to enter the sweepstakes contest. While it is possible for a contestant to computer generate multiple paper entries, it does become labor intensive and expensive for the contestant to do so in that each entry must still bear a post office legal stamp and be manually mailed.

For the sweepstakes provider (alternatively referred to as administrator) the manual processing of sweepstakes entries represents a major bottleneck and expense for providing a sweepstakes contest. The lack of uniformity of the entries (some may be hand written) requires human interpretation which often times leads to entry errors. Manual data entry is also time consuming, and therefore requires a large staff of keyboard entry personnel.

Some form of automation that minimizes the manual processing of contestant information for data base entry would make a sweepstakes promotion much more cost effective. The automation solution should also incorporate a method of making the entries uniform and machine readable.

FIG. 1 is an example of an actual sweepstakes as found in the prior art. It should be noted that the sweepstakes requires manual processing for both the contestant and the sweepstakes processing center.

SUMMARY OF THE INVENTION

According to some embodiments, a network based sweepstakes system is disclosed. The system includes a database server configured to receive contestant information from a sweepstakes contestant. The system further includes a web server configured to generate an optically machine readable (OMR) code corresponding to an index number representing the sweepstakes contestant, and transmit the OMR code to at least one web enabled device configured to receive the OMR code. The system also includes an optical scanner configured to scan a physically received OMR code and extract the index number used to retrieve the contestant entry information from the database.

According to some embodiments, a method for implementing a sweepstakes is disclosed. The method includes the steps of receiving contestant information for entering a sweepstakes, generating an optically machine readable (OMR) code corresponding to an index number representing a sweepstakes contestant, transmitting the OMR code to a web enabled device of a contestant, and optically scanning the physically received OMR code to extract the index number used to retrieve the contestant entry information from the database.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 1 is an example of a prior art sweepstakes;

FIG. 5 is a sweepstakes setup screen example according to an embodiment of the present invention;

FIG. 6 is an OMR type code example according to an embodiment of the present invention;

FIG. 7 is a 1 dimensional (1 D) OMR code (barcode example) according to an embodiment of the present invention;

FIG. 8 is a 2 dimensional (2 D) OMR code (QR code example) according to an embodiment of the present invention;

FIG. 9 is a sweepstakes specification file example according to an embodiment of the present invention;

FIG. 11 is a contestant database record layout example according to an embodiment of the present invention;

FIG. 21 is a screen example of the OMR code entry for a "scheduled" sweepstakes according to an embodiment of the present invention;

FIG. 22 is a screen example of the OMR code entry for a "scheduled" sweepstakes, indicating an invalid OMR code entry according to an embodiment of the present invention;

FIG. 23 is a screen example of the OMR code entry for a "scheduled" sweepstakes, indicating the drawing has not yet occurred according to an embodiment of the present invention;

FIG. 24 is a screen example of the OMR code entry for a "scheduled" sweepstakes, indicating the contestant was not a winner according to an embodiment of the present invention; and FIG. 25 is a screen example of the OMR code entry for a "scheduled" sweepstakes, indicating the contestant was a winner according to an embodiment of the present invention.

DETAILED DESCRIPTION OF THE INVENTION

Figure 2:
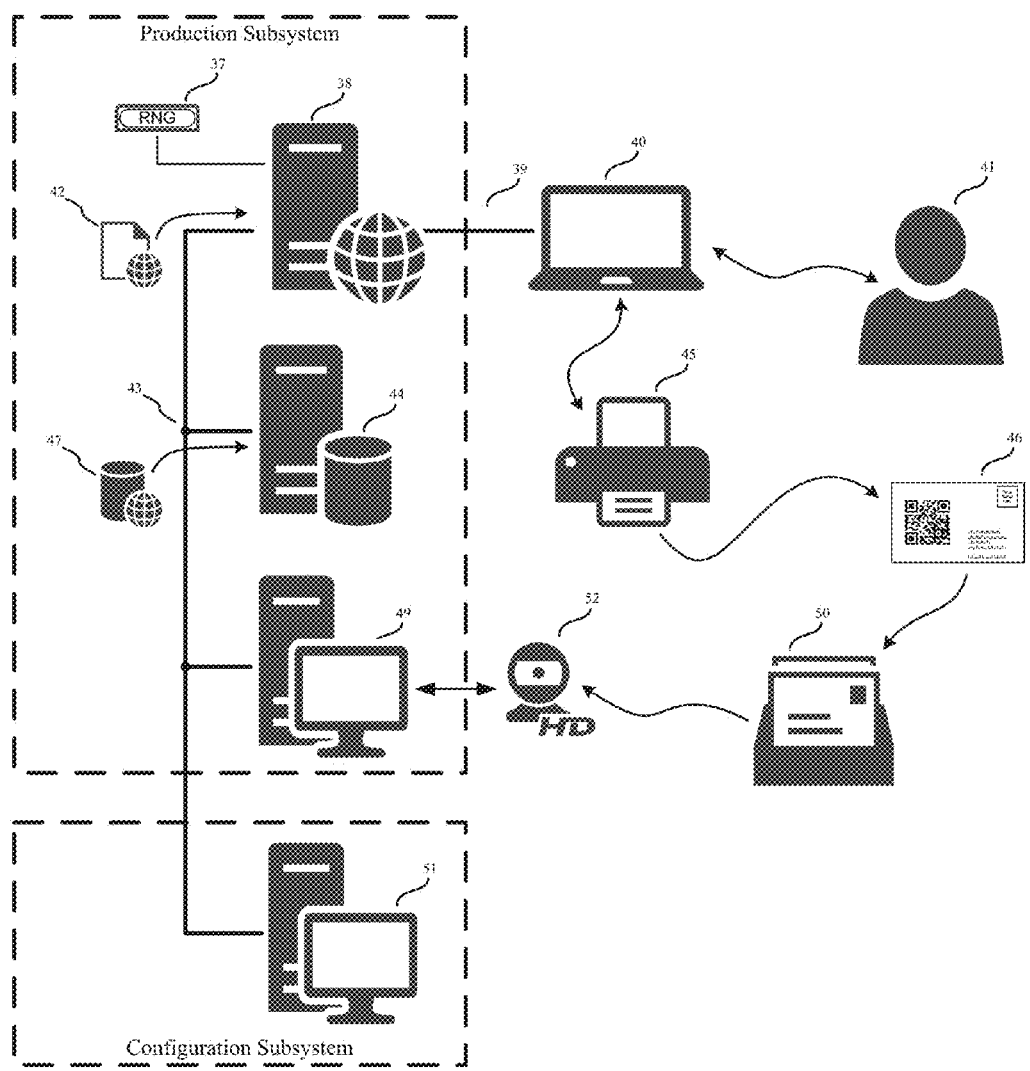
FIG. 2 is an apparatus for network based sweepstakes system manual postcard mailing embodiment according to an embodiment of the present invention.

According to various embodiments, disclosed is a network based sweepstakes system hereafter referred to as the Alternative Method Of Entry (AMOE) system for Sweepstakes management and control. The purpose of the AMOE system is to highly automate the process of providing to the public a network based sweepstakes system.

The AMOE system incorporates a computerized application running on some form of workstation computer (configuration system) to "a priori" define all aspects of a sweepstakes promotion using a database schema identifying all of the processing variables required. The control and specification information is entered using an electronic entry form and placed into a specification data base found on the configuration system.

The sweepstakes will be hosted on a "web server" (production system) and all sweepstakes control information contained within the specification data base is downloaded from the workstation to the web server computer. The production system will create, configure and manage contestant information in the contestant data base according to the specification data base. Note that the workstation and web computer may be the same machine (computer) however, for security reasons it is preferred they are separate machines.

Once the sweepstakes has been started, the web server will permit a contestant to enter the sweepstakes using his or her internet enabled device (computer, tablet or smart phone by example.) The contestant will request their internet browser to access the (URL) address of the sweepstakes web server hosting the promotion.

Once connected to the sweepstakes website, the contestant will provide personal information to submit their entry into the sweepstakes. The personal information may include (but is not limited to) their name, address, email address and cellular phone number. The information provided will be entered into the sweepstakes data base using a web based entry form. Once data entry is completed by the contestant, the web server generates a document containing an Optically Machine Readable numerical Code (OMR code) and formats the image into a printable form using an image coding standard such as PDF or JPEG. As a next step, the web server will download the printable document to the contestant's internet enabled device. The printable document will also include a "mail in" address for sweepstakes central processing. The contestant is then required to print out the mail in document and physically mail the entry to the address of the identified processing location.

Once received at the processing center the contestant's mailed in entry is optically "scanned in" and the customer's unique numerical (index) code is extracted from the OMR image and is checked against the contestant data base. If the unique numerical code is matched (found) within the data base a logical flag is set in the contestant's record signifying that the contestant has properly and officially entered the sweepstakes.

There are two preferred operational embodiments for the AMOE system:

The first embodiment is an "instant" single chance method for a contestant to win a grand (or secondary) prize once the contestant's mailed entry has been received and processed by the central processing center. In the event the contestant has mailed in multiple sweepstakes entries and the sweepstakes permits multiple (and separate) entries, the contestant will be permitted a single chance for every processed entry they have submitted. Once the mailed entry has been processed and validated by the central processing center, the contestant will be notified (email or cell phone text) that they can try to win a prize by logging onto a web site identified by a unique URL reference. In the event of a win (grand prize or secondary prize) the contestant will be contacted by the sweepstakes provider using the information the contestant provided at the time of entry.

The second preferred embodiment provides for a single sweepstakes drawing at a specific time and date. This embodiment is referred to as a "scheduled" sweepstakes drawing. It is possible (depending on the sweepstakes configuration defined by the schema at the configuration stage) to have single or multiple grand prize winners and optionally secondary prize winners. A contestant will be notified by email, cell phone text or mailing address in the event they are a winner (or multiples thereof.) As with the first preferred embodiment a contestant must send in the machine readable document containing the OMR code. The OMR code will also permit a contestant to determine their "status" by accessing an AMOE system web page and entering the numerical equivalent of the OMR code.

FIG. 2 illustrates an AMOE network-based sweepstakes system using manual postcard mailing according to an embodiment of the present invention. The AMOE sweepstakes system may contain one or more computers (also referred to as machines) where some computers are defined as work stations and others are defined as web or database servers. A database server 44 refers to the back-end system of a database application using client/server architecture. The computers interact with each other and sweepstakes contestants using both private and public networks. A contestant 41 is a person that uses a web enabled device 40 to enter a sweepstakes contest. A web enabled device 40, such as a laptop, tablet, or mobile phone as nonlimiting examples, refers to a product that can be used through, or in conjunction with, a publicly accessible network 39. A web-enabled application may be accessed through a web browser on the web enabled device 40 or be able to connect to other web-based applications in order to synchronize data between the web applications.

A publicly accessible network 39, such as the Internet, is a vast computer network linking smaller computer networks worldwide. This may include commercial, educational, governmental and other networks. All of these networks must use the same set of communications protocols.

A private network 43 or intranet is a network based on TCP/IP protocols (an internet) belonging to an organization, usually a corporation, accessible only by the organization's members, employees, or others with authorization. An intranet's Web sites look and act just like any other Web sites, but the firewall surrounding an intranet fends off unauthorized access.

Web servers 38 are defined as computers that deliver web pages. Every web server has an IP address and possibly a domain name. When a request to display a web page 42 is made, the server 38 fetches the indicated page and sends it to the requesting device 40. A web page 42 is defined as a document on the Internet 39. Every web page 42 is identified by a unique URL (Uniform Resource Locator).

The AMOE sweepstakes system includes two key elements: the Configuration subsystem and the Production subsystem. The configuration subsystem is used to create and configure all aspects of the AMOE sweepstakes system. This subsystem is only accessible by authorized personnel and will not be accessible via the publically accessible network 39 by the contestant 41. The production subsystem is a group of computers used to execute the various phases of the AMOE sweepstakes system. The production subsystem is accessible by authorized personnel via a private network 43 and by the contestant 41 via a publically accessible network 39.

The Configuration subsystem may include one or more workstations 51 running a sweepstakes specification generator application, to be discussed in more detail below. A workstation 51 is a special computer, normally offering higher performance than a personal computer, and designed for technical or scientific applications. Intended primarily to be used by one person at a time, they are commonly connected to a local area network and run multi-user operating systems.

The production subsystem may include one or more web servers 38 accessible by the contestant 41 via the publically available network 39. The webservers may display one or more web pages 42 such as the Contestant online entry page or the Online Drawing page. The subsystem may also include one or more database servers 44 used to store as an example the information pertaining to the contestant 41. The production subsystem may further include one or more workstations 49 connected to an OMR code reader 52, such as a scanner or digital camera used to scan the OMR code.

Figure 3:
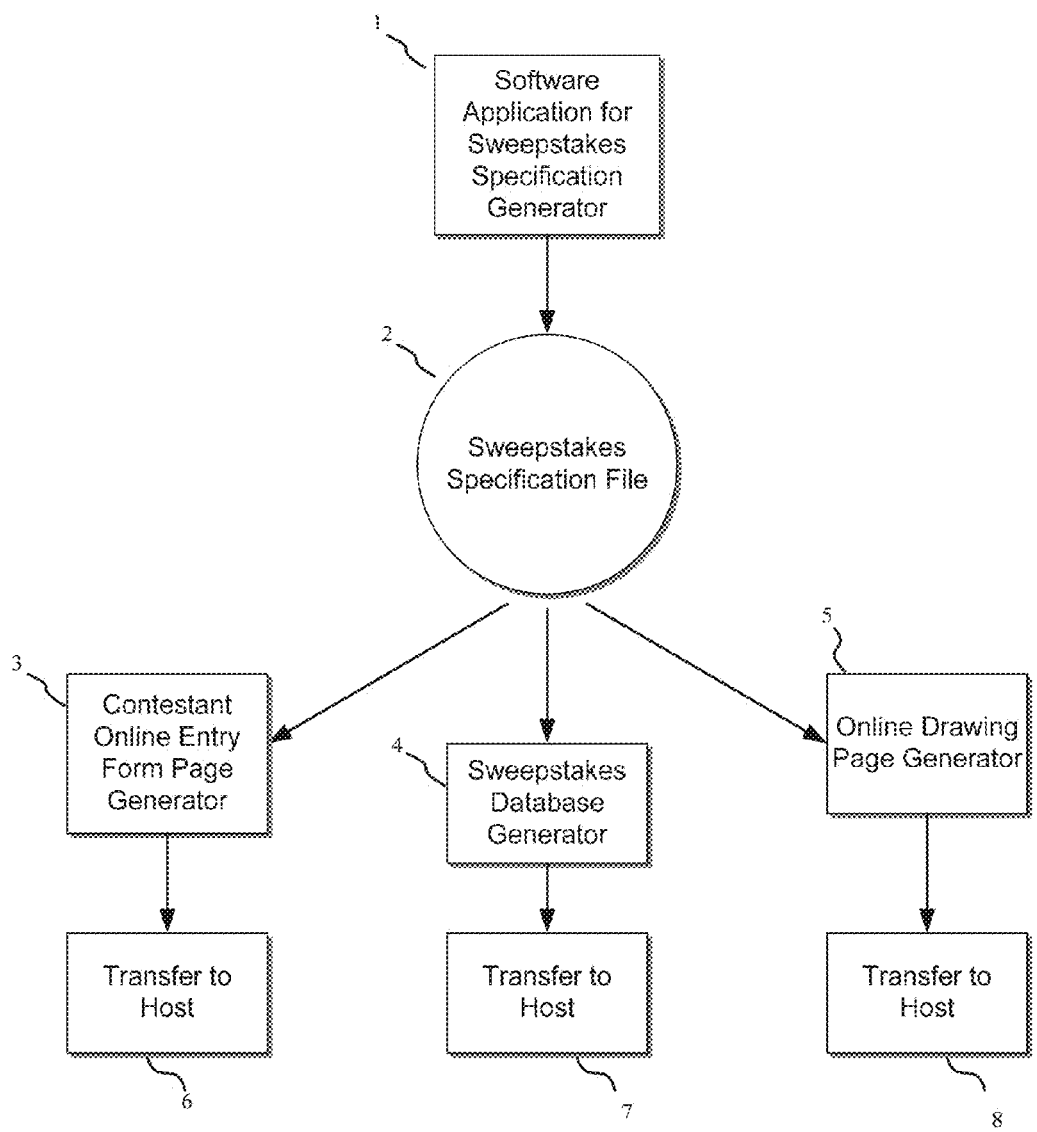
FIG. 3 is a sweepstakes page flow diagram according to an embodiment of the present invention.

FIG. 3 illustrates a flow diagram for the generation of the various web based pages 42 required for the web based page servers 38 (production system) according to an embodiment of the present invention. The process begins at step 1 where a software application (referred to as a sweepstake specification generator) captures the specifications for the sweepstakes. The specification generator then produces a specification file from the sweepstakes information at step 2. This file is considered to be the guideline or specification to be used for the generation of the 3 main components of the sweepstakes.

From the specification file, a contestant online entry form, a schema for contestant database collection, and an online drawing page are created at steps 3, 4, and 5, respectively. It should be noted that steps 3, 4, and 5 may occur in any order or concurrently. At step 3, a contestant entry form is created with a contestant online entry form page generator. The contestant online entry form page generator is a software application that will access the sweepstakes specification file and will extract the information pertinent to the online entry form. At step 4, a database generator produces a schema for contestant data base collection once the sweepstakes is activated. The database generator utilizes the sweepstakes specification file to create a database or file that will store all applicable information regarding the contestant's entries. At step 5, an online drawing page generator establishes the page information that specifies which type of drawing is to occur (instant or scheduled). In an "instant win" type embodiment, the online drawing page generator creates an online page that displays the instant game piece. The page that is generated is of a dynamic nature, meaning that the while the page appearance may be the same for each contestant, the data i.e. game results, will be different each time the page is accessed by the contestant.

Each generator then downloads their generated contents to a hosting web server 38 at steps 6, 7, and 8, respectively. It should be noted that steps 6, 7, and 8 may occur in any order or concurrently, and that one or more servers may be used for the web server 38.

Figure 4:
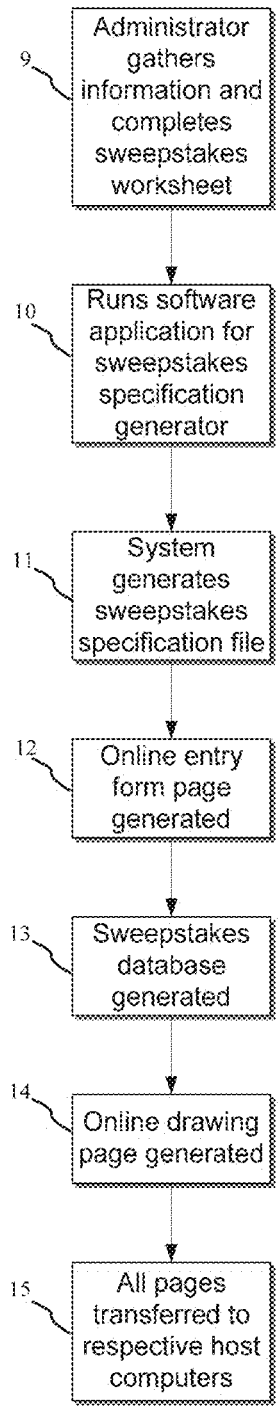
FIG. 4 is a flow diagram for sweepstakes generation for a network based sweepstakes system according to an embodiment of the present invention.

FIG. 4 depicts the process for the generation of a sweepstakes according to an embodiment of the present invention. The process begins with a sweepstakes administrator (human) gathering all of the information that will be required for a sweepstakes at step 9 and then accessing a software application to generate the sweepstakes specifications at step 10. The administrator enters all pertinent and required information for a sweepstakes setup.

An example of a Sweepstakes Setup Screen 73 is illustrated in FIG. 5 according to an embodiment of the present invention. The sweepstakes administrator would access this screen to enter all of the information required 73 to setup and create the sweepstakes specification file. The administrator may at any point in the generation process, select the "save" button 75. If the administrator would like to review and/or edit a previously generated sweepstakes specification file, they may select the "load" button 74. All data that was previously saved will be loaded into the appropriate fields 73.

A brief description of each piece of information 73 follows:

The "save file" is the name of the sweepstakes specification file as stored on the computer.

The "Entity ID #" is a unique identification number for the individual or company holding the sweepstakes.

The "Sweepstakes #" would be a unique number used to identify a sweepstakes.

The "Sweepstakes Name" field could be used to enter a verbose description of the sweepstakes such as JD's Spectacular Summer Sweepstakes as a nonlimiting example.

The "Webpage Specification File" would be the file name that contains all the information required to generate the Contestant Online Entry Form.

The "Optically Machine Readable (OMR) Code Type" field would be used to identify to the system the type of OMR Code to generate for the sweepstakes.

FIG. 6 illustrates a sample table of optical machine-readable (OMR) code types. The types may include a 1-dimensional bar code or a 2-dimensional quick reference (QR) code.

A bar code includes a group of printed and variously patterned bars, spaces, and sometimes numerals, configured to be scanned and read into a computer memory. The bar code contains information (as identification) about the object it labels. An example of a bar code is shown in FIG. 7 according to an embodiment of the present invention.

A QR code includes black modules (square dots) arranged in a square grid on a white background, which may be read by an imaging device (such as a camera) and processed using Reed-Solomon error correction until the image can be appropriately interpreted. The required data is then extracted from patterns present in both horizontal and vertical components of the image. An example of a QR code is shown in FIG. 8 according to an embodiment of the present invention.

Referring back to the field descriptions in FIG. 5, The "Captcha Active" field refers to whether a Captcha is displayed on the Contestant Online Entry Form. If the sweepstakes administrator chooses to have a Captcha displayed, the field would be set to true.

The "E-Mail Validation Verbiage File" is used to identify the file that stores the text that will be included in the verification message sent to the contestant upon the processing center receiving the postcard.

The "Database File Name" is the field that identifies the file where the information about the contestant entries will be stored.

The "Contest Rules File Name" field describes a hyperlink to the sweepstakes rule file which may be included on the online entry webpage.

The "Mail To Lines 1-4" may be used to identify the address of the processing center to which the contestant is to mail the postcard.

The "Sweepstakes Start" and "End Dates" are used to identify the timeframe when the Online Entry Form will be accessible.

The "Must be Postmarked By" field is used to identify the date by which the contestant must drop the postcard at a mail delivery service.

The "Unique URL" field describes the URL each AMOE sweepstakes will be assigned to allow the contestant to access the web page(s) associated with the AMOE sweepstakes on the publically accessible network.

The "Win Type" field may be used to identify if the sweepstakes is an instant win or a scheduled draw type sweepstakes. If the sweepstakes is a scheduled draw, the "Draw Time" and "Date" fields will be completed with the date and time of the drawing of the winner.

The "Entry Time Restriction" fields may be used to indicate any restrictions on the number of times a contestant may enter the sweepstakes.

The "Opt-in Verbiage File Name" points to the file which contains the message that will be displayed near the "opt-in" checkbox.

The "Offset Number" is a secret 64 bit number that will be added to the incrementing index value to produce a composite index number (contestant record number). This is a clear text number which will then be encrypted.

The "Encryption Key" is a secret key used to encrypted the composite index number using a symmetrical key encryption algorithm such as Triple DES.

Referring back to the process illustrated in FIG. 4, after all the information is entered and the administrator selects the "save" button, the software application will automatically create the sweepstakes specification file at step 11. An example of a sweepstakes specification file is shown in FIG. 9 according to an embodiment of the present invention.

Figure 10:
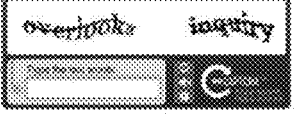
FIG. 10 is a contestant online entry form example according to an embodiment of the present invention.

At step 12 of FIG. 4, an online entry form page is generated from the sweepstakes specification file. An example of a generated online entry form is shown in FIG. 10 according to an embodiment of the present invention. The Contestant Information Area 33 on the screen represents a sampling of the personal information that may be required from the contestant to enter the sweepstakes. The Opt-In area 34 allows the contestant to express permission to allow the promoter to send merchandise, information or more messages, usually via text messaging or bulk emails. This is the method generally used by most direct marketing firms, subscription or non-subscription periodicals, information suppliers, etc. After the opt-in, the promoter will keep on sending the material or messages until the recipient chooses to opt out. The message that is displayed is stored in the "opt-in verbiage file" indicated in the sweepstakes specification file. To ensure that a human is entering the information (not an automated system) a Captcha 35 may be used. A CAPTCHA (an acronym for "Completely Automated Public Turing test to tell Computers and Humans Apart") is a type of challenge-response test used in computing to determine whether or not the user is human. Once the contestant completes the Online Entry Form, they can select the Register Button 36 to submit their information.

At step 13 of FIG. 4, a sweepstakes database is generated from the sweepstakes specification file. An example of a contestant database record layout is shown in FIG. 11 according to an embodiment of the present invention. The personal information required from a contestant would be stored in their associated fields in the contestant database record. Once a contestant's information is submitted, there are additional fields that will be automatically populated with information when various events occur in the overall process of sweepstakes entry. For example the "SweepstakesID", "Index #", "RecordCreatedDate" and "RecordCreatedTime" are automatically populated when the contestant selects the "Register" Button 36 in the online entry form. The "PostCardReceived" field is initially populated with a false indication, but will automatically change to a true indicator along with the "PostCardReceivedDate" field when an OMR code is scanned at the processing center, to be discussed further below.

At step 14 of FIG. 4, an online drawing page is generated from the sweepstake specification file. Various nonlimiting examples of online drawing pages are illustrated in FIGS. 18-25, to be discussed further below.

The final step 15 is to transfer the generated files to their respective hosts. This is typically done by example using a file transfer protocol (FTP) software application.

Once the configuration files are loaded on the sweepstakes web server(s) the sweepstakes will start at the time defined during the configuration process. Once started, contestants can access the web server 38 to provide their entry information.

Figure 12A:
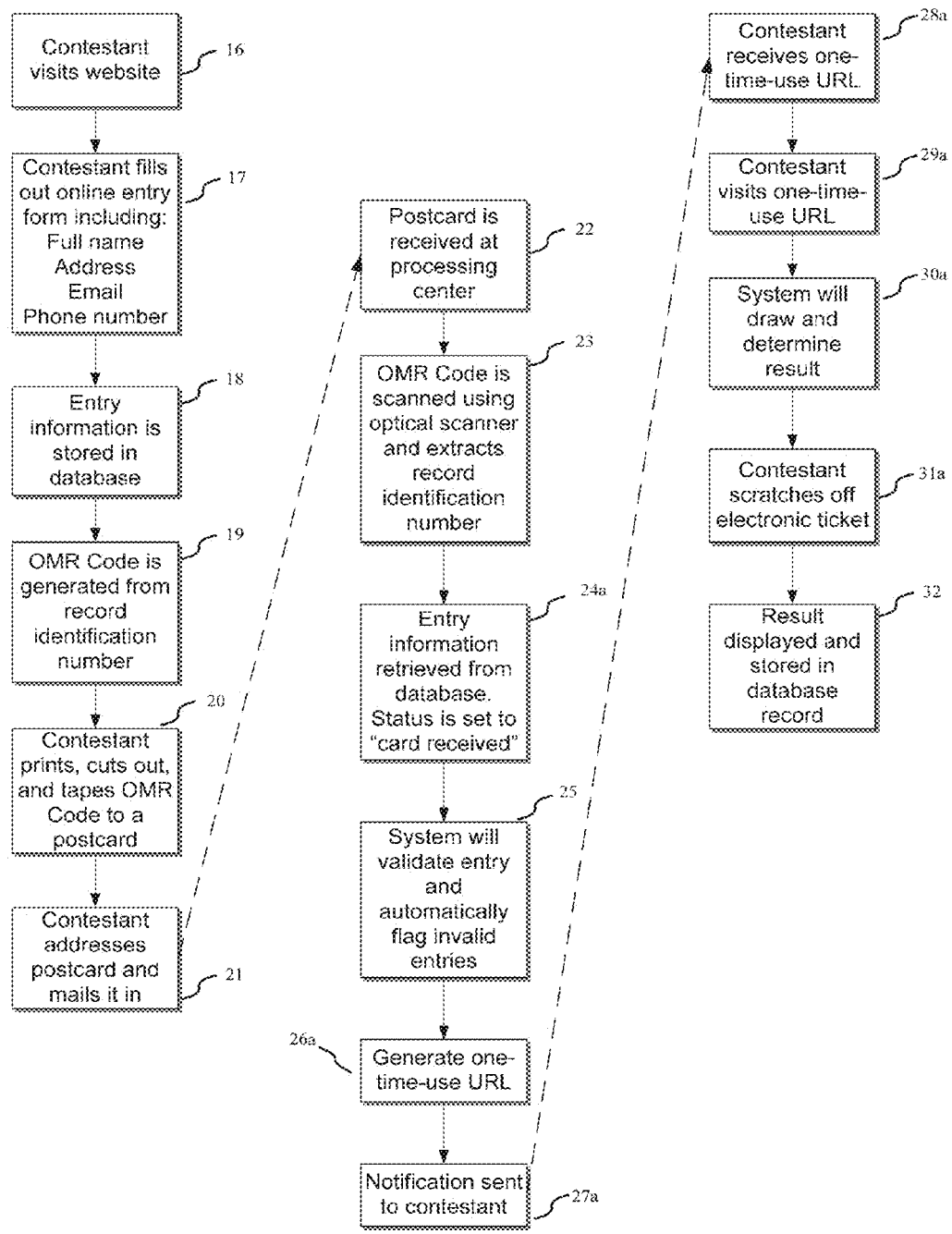
FIG. 12a is a flow diagram for contestant interactivity with a network based sweepstakes system "instant win" version according to an embodiment of the present invention.
Figure 12B:
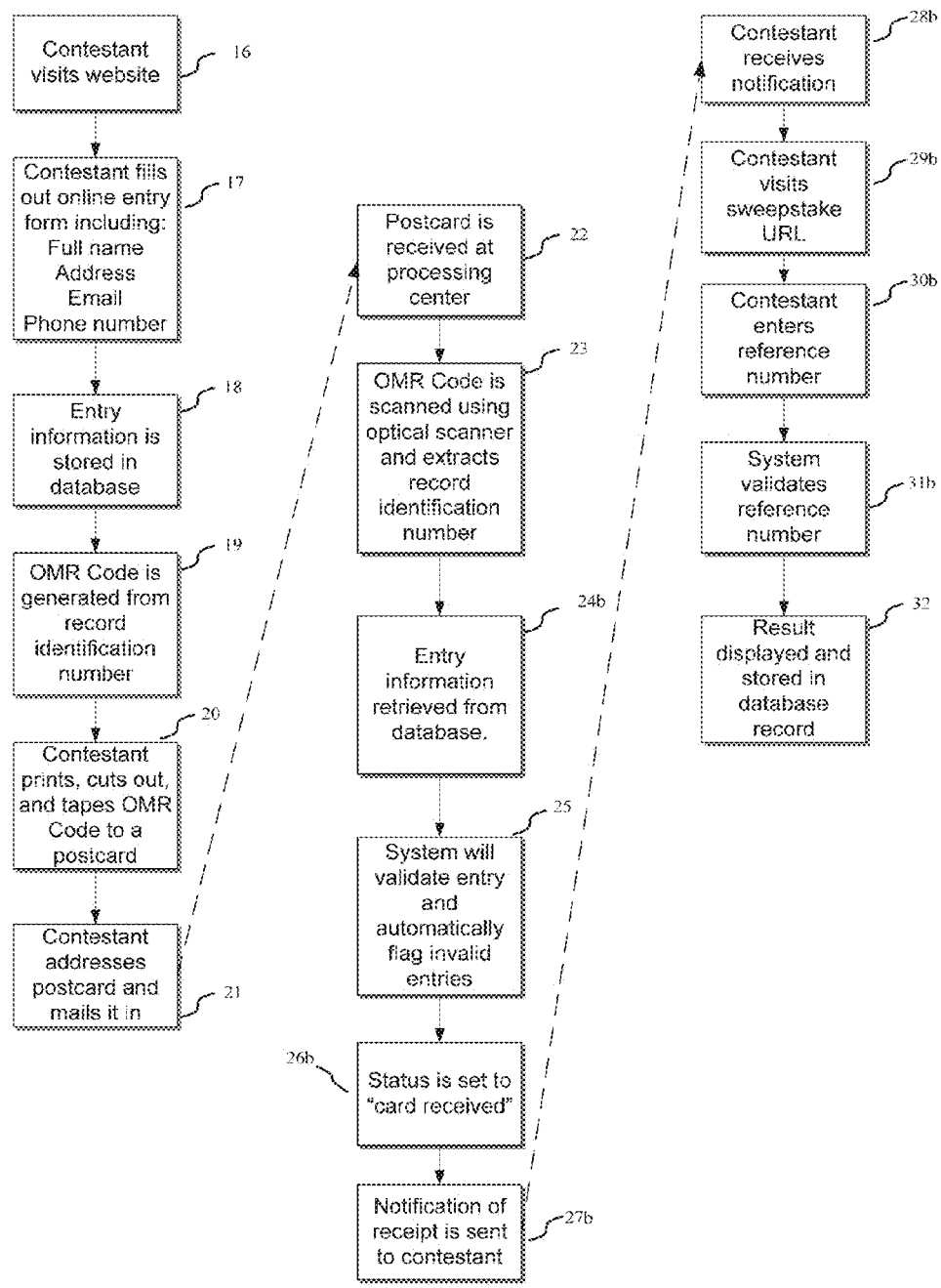
FIG. 12b is a flow diagram for contestant interactivity with a network based sweepstakes system "scheduled win" version according to an embodiment of the present invention.

FIGS. 12a and 12b illustrate flow diagrams for contestant interactivity with a network based sweepstakes system according to embodiments of the present invention. Figure 12a describes the "instant win" embodiment. FIG. 12b describes the "scheduled win" embodiment. References will also be made to the elements in FIG. 2 when describing the process shown in FIGS. 12a and 12b.

At step 16 of FIGS. 12a and 12b, the contestant 41 will visit the sweepstakes website 49 via a web enabled device 40. At step 17, the contestant 41 would then be required to fill out the online entry form from their web enabled device 40 including such information as full name, address, email, and phone number facilitated by the web server 49. Once the information is submitted, it is then stored in the sweepstakes database 47 at step 18.

A key concept to the management of contestant information is the index number (a single integer variable). The index number is a unique (non-repeating value) and will identify a contestant's entry into the sweepstake. The index number is initialized to the value of 0 at the start of the sweepstake promotion and will be incremented by 1 with every new index number request. The maximum index number (contestant entry) is defined by the index binary word size. By example, an integer based unsigned 32 bit words largest value represents the number 4,294,967,295 decimal or approximately 4 billion. The index value should never be allowed to rollover to zero, a rollover introduces equivocation rendering the index numbers as non-unique. The number of records that can be stored in the database is dependent on the index number word size. The word size selected must accommodate the maximum number of contestant entries in the database. A minimum safe value for word size is 32 bits.

The index number as used in the AMOE system identifies a "record" in the client database. As a contestant submits his or her personal information, the information is entered into a record. The contestant record number is therefore the current index number. To retrieve contestant data the index number is used to select the record.

The AMOE system provides the contestant with an OMR code (number). The OMR code is obtained by transforming the contestant record index number. The transformation process must be reversible so that the original index number can be extracted from the OMR number. An essential requirement of the OMR code is that it must also have a security element to it. Security is required to insure that third party malicious activity can be minimized.

There are multiple methods that can be used to transform the index number into an OMR number. The simplest method is to use the index number and concatenate a fixed length random number to it. The preferred embodiment for the AMOE system is to use a hardware random number generator 37 or a software based random number generator. The random number value will be stored in the contestant record in the contestant database. The final binary word size of the OMR number is a critical factor that will determine the optical encoding method used to produce an optically scannable document. A 2D encoding method such as a QR code will support a much larger number than a 1D barcode. A more effective method and the preferred embodiment for the AMOE system is to transform the index number into an OMR code is by using a symmetric encryption algorithm. This method uses a private key, an offset value an encryptor/decryptor such as triple DES and the index number. This process is reversible and by applying the OMR code and using the decryption mode the original index number can be extracted. The encryption method can be further enhanced for security purposes by concatenating a random number to the base OMR value (encrypted index value). The random number will be stored in the contestant record.

Figure 13:
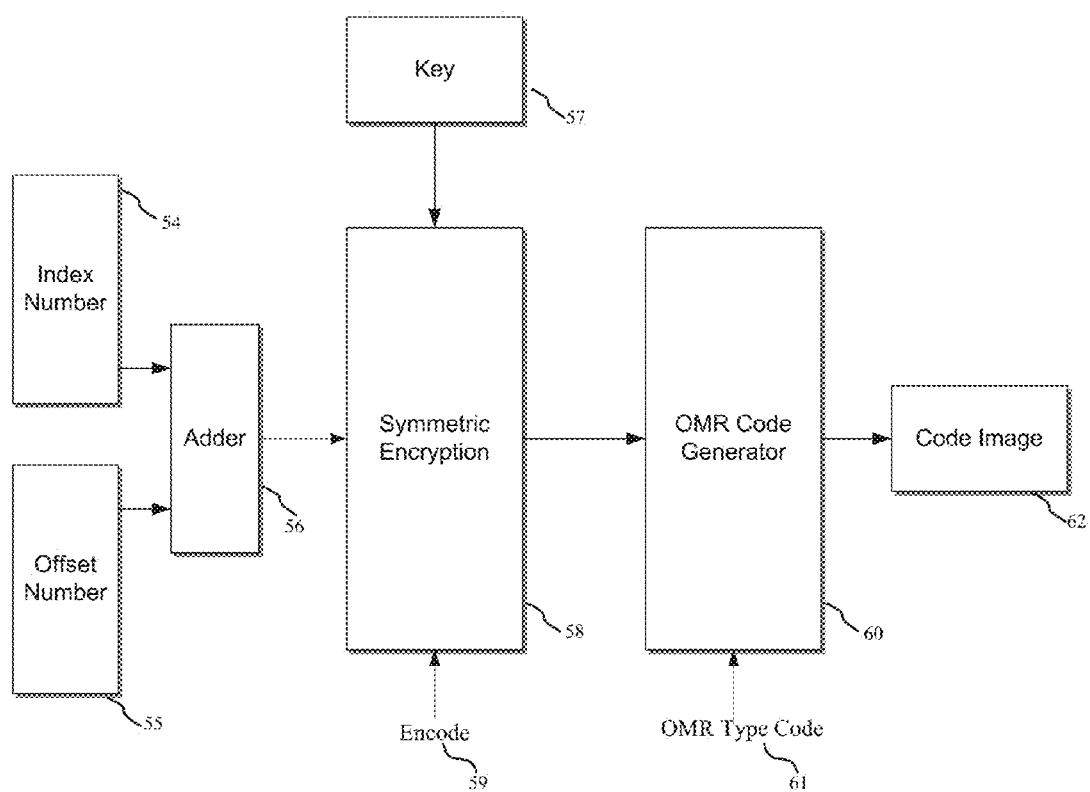
FIG. 13 is an index number to OMR code image encoder according to an embodiment of the present invention.

Referring back to FIGS. 12a and 12b, at step 19 the database 44 will generate an OMR Code and send it via the web server 38 to be displayed on the contestant's 41 web enabled device 40. FIG. 13 is a block diagram that represents the process of producing an OMR Code using a symmetrical encryption process. Index Number 54 and offset number 55 are added together to create a secret index code, using adder 56. The composite index code is then encrypted 58 using a secret key 57. The output value from the encryption process is encoded into an OMR image 62 using the OMR Code Generator 60. The OMR Type Code 61 will determine the type of OMR code generated, referring back to FIGS. 6, 7 & 8. The OMR code image 62 will be printed and affixed to a post card (or envelope) by the contestant.

Figure 14:
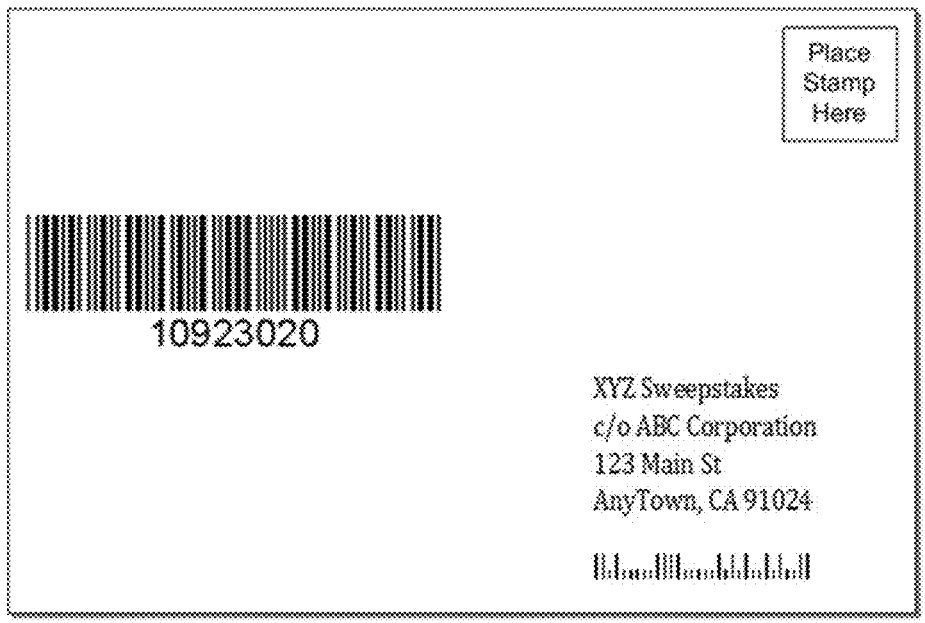
FIG. 14 is a postcard with 1 D OMR code and postal barcode example according to an embodiment of the present invention.
Figure 15:
FIG. 15 is a postcard with 2 D OMR code and postal barcode example according to an embodiment of the present invention.
Figure 16:
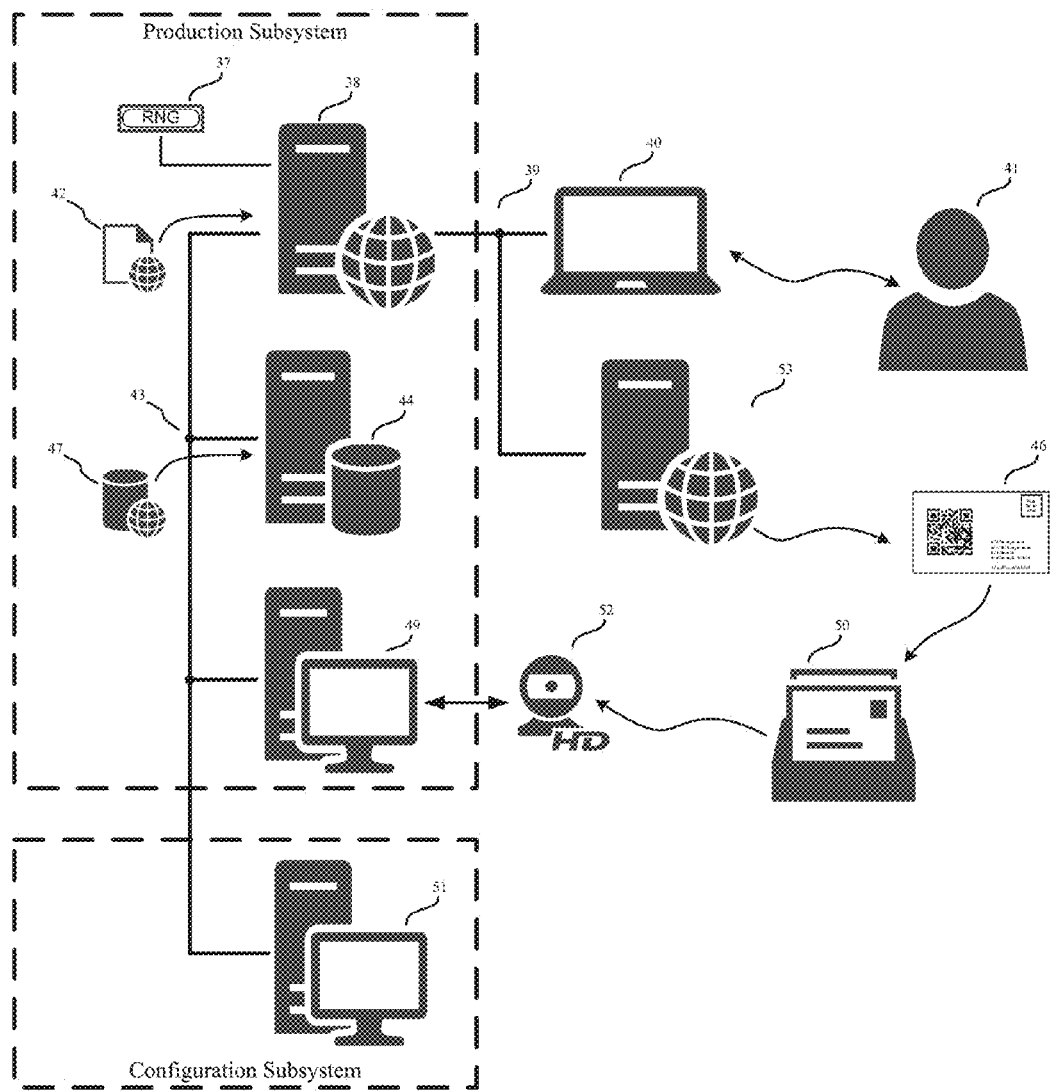
FIG. 16 is an apparatus for network based sweepstakes system 3 rd party postcard mailing embodiment according to an embodiment of the present invention.

Referring back to FIGS. 12a and 12b, at step 20 the contestant 41 will print using a printer 45 the OMR Code, cut it from the page, and affix it to a postcard 46 or insert it into an envelope. At step 21, the contestant 41 will address the postcard 46 (or envelope) and then send it out via a delivery service 50. FIG. 14 is an example of the post card to be mailed by the contestant with a 1D OMR code according to an embodiment of the present invention. FIG. 15 is another example of a postcard with a 2D OMR code affixed according to an embodiment of the present invention. Alternatively, a contestant may use a $3^{rd}$ party mailing service 53 as shown in FIG. 16 according to an embodiment of the present invention. The $3^{rd}$ party mailing service 53 would address the postcard 46 and send it out via a delivery service 50 instead of the contestant 41.

At step 22 of FIGS. 12a and 12b, the postcard 46 or envelope will then be received at the central processing center from the delivery service 50 such as the USPS, FedEx, or UPS. Once received, at step 23 an OMR Code reader 52 will scan using an optical scanner and extract the OMR code generated at the time the contestant entered the sweepstakes. The OMR code will then be converted into a record identification number. The record identification number is used to retrieve the contestant entry information from the database 47 and set the status to "card received" in the database 47 at step 24a of FIG. 12a. In FIG. 12b, at step 24b only the contestant entry information is retrieved from the database 47.

Figure 17:
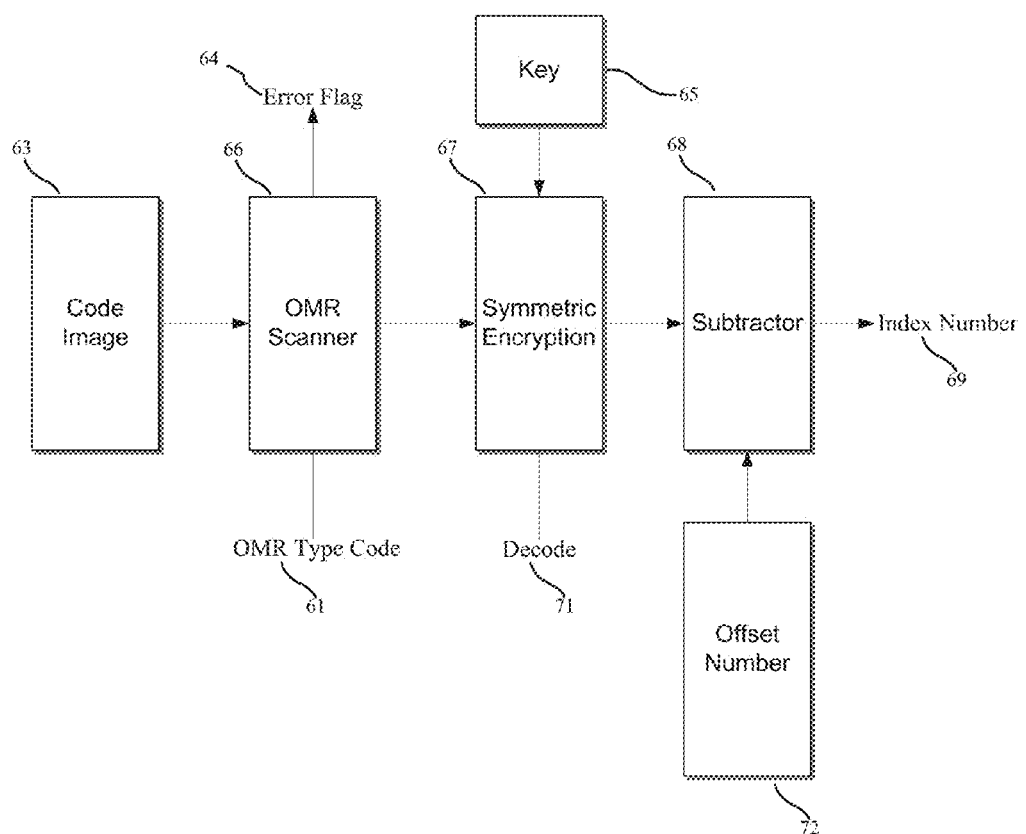
FIG. 17 is an OMR code to index number decoder according to an embodiment of the present invention.
Figure 18:
FIG. 18 is an initial scratch off game card example according to an embodiment of the present invention.

FIG. 17 is a block diagram for the process of reading in the OMR code from a postcard and extracting the original index number. The code image from a postcard 63 is scanned by an OMR scanner 66 to extract the reference number generated by the original encoding process. In the event the OMR scanner cannot successfully extract a valid code from the code image, an error flag 64 is set to indicate that the OMR code cannot be processed and that the code will have to be manually entered by a human operator. The output of the OMR scanner 66 and image processor are then further processed by a symmetric decryptor 67 according to a preferred embodiment, producing the contestant's index number 69 by way of subtractor 68. Note that the decryptor uses same key and offset number used in the encryption process illustrated in FIG. 13. The offset number field 72 will identify the value that will be added to the Entry Index Number to help reduce possible fraudulent activities. The Encryption Key field will be used to identify the key used for the symmetric encryption and decryption algorithms.

At step 25, the database program 44 will validate the entry and automatically flag any invalid entry. The sweepstakes system will perform various checks and balances on the supplied contestant information to verify it is correct. Such checks may include checking the address supplied against the USPS mailing database, or the Date of Birth entered indicates the contestant is of legal age to enter the sweepstakes. If the information passes the various checks and balances, the "DataVerified" field will be set to a positive status. The "EntryValidated" field is used to indicate if the contestant's entry conforms to the "Entry Time Restriction" parameters as set in the sweepstakes specification file.

The AMOE Sweepstakes system allows for at least two variations (preferred embodiments) to participate in the sweepstakes promotion. The first variation is referred to as an "instant win" sweepstakes, illustrated in FIG. 12*a* . Once the contestant has filled in the online personal information and the central processing facility has processed the mail in document, at step 26*a* a one-time-use URL address will be generated. Then at step 27*a*, the contestant will be notified by email or cell phone (SMS) message to select a specific URL address to enter an instant win web page on the AMOE web server.

Figure 19:
FIG. 19 is a scratch off game card in progress example according to an embodiment of the present invention.
Figure 20:
FIG. 20 is a completed scratch off game card example according to an embodiment of the present invention.

There are many ways an instant win game might be configured. A nonlimiting example would be an electronic "scratch off" ticket, illustrated by FIG. 18 according to an embodiment of the present invention. Using a pointer device, the contestant can "rub off" areas of the scratch card to reveal what is hidden underneath. FIG. 19 is an example where the electronic scratch card is partially rubbed off. FIG. 20 is the same card from FIGS. 18 and 19 where everything underneath has been exposed by the contestant "rubbing" off the upper layer completely. In this example the contestant has won a $10 gift card.

At step 28*a*, the contestant receives the notification with the one-time-use URL address. The contestant 41 will be able to receive the notification on their web enabled device 40. Once received, at step 29*a* the contestant will visit the one-time-use URL on their web enabled device over the sweepstakes web server 38. At step 30*a*, the web server 38 will then draw a random number 37 and determine if the contestant has won any prize. The contestant 41 using their web enabled device 40 will be presented a screen with an electronic scratch off ticket from the web server 38. Using their web enabled device 40, at step 31*a* the contestant 41 will play the ticket presented. Once the ticket is played, at step 32 the result is displayed on the web enabled device 40 and sent and stored in the database 47 by the web server 38.

The second variation is referred to as a "scheduled sweepstakes drawing", illustrated in FIG. 12*b* . For a scheduled drawing, a time and date is established where the AMOE system will perform a random drawing using a random number generator.

There are two types of drawings associated with a scheduled sweepstakes. The first type is a "guaranteed winner". A guaranteed winner is selected randomly by generating a Random number between one and the last index number generated when the open entry segment of the sweepstakes was active. The randomly selected number will identify the record number in the contestant data base to signify the individual winner. Optionally multiple winners may be selected in the same manner if the sweepstakes rules permit multiple winners. It is also possible to provide secondary prizes to a selected subset of contestant entries. The secondary prizes may be awarded by generating a random number between one and the last index number generated. The number of prizes will be dependent on the rules established at the beginning of the sweepstakes promotion. The second type of drawing is a "non-guaranteed winner". This type of sweepstakes drawing introduces an added layer of complexity in that the odds of a winner are established as a probabilistic result. By example the odds are set at 25 million to one for a winner. 1 million entries occurred by the end of the sweepstakes. This will set the odds to 1 in 25 that any entry will win. To first determine if there is going to be a winner a random number is selected between 1 and 25. A target number selected in advance will determine if there is a winner by matching the random number generated between 1 and 25. If the random number drawn matches the target number, a winner is selected from the contestant data base by randomly selecting a number between 1 and the last index number generated during the active entry period of the sweepstakes. A winning contestant will be automatically notified by email, phone text or regular mail. It is also possible for contestants to win secondary prizes. This process will be implemented using the secondary prize allocation method as used for the guaranteed winner variation.

For a scheduled sweepstakes, once the contestant has filled in the online personal information and the central processing facility has processed the mail in document, at step 26*b* of FIG. 12*b* , the status is set to "card received" in the database 47. A notification of this receipt is sent to the contestant at step 27*b*, and the contestant receives the notification at step 28*b*. To check their "win" status, the contestant accesses a web page found on the AMOE system web server by visiting the sweepstakes URL address at step 29*b*. The contestant then enters their OMR code reference number at step 30*b* and the system validates the reference number at step 31*b*. As a nonlimiting example, FIG. 21 represents a screen where the contestant will enter their reference number to determine their win status in the sweepstakes. Here, a 9 digit code is required for entry by the contestant. As a nonlimiting example, FIG. 22 shows a screen where the contestant entered an incorrect reference number (where the reference number was not found in the sweepstakes database). As a nonlimiting example, FIG. 23 shows a screen where the contestant requested their win status before the sweepstakes was completed.

At step 32 of FIG. 12*b* , once the contestant enters their number and the system validates the number, the result of the sweepstakes is then displayed on the web page and stored in the database record. As a nonlimiting example, FIG. 24 illustrates a screen where the contestant successfully entered their reference number and was notified they were not a winner. As a nonlimiting example, FIG. 25 illustrates a screen where the contestant successfully entered their reference number and was notified they were a winner.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A network based sweepstakes system comprising:
  a database server configured to receive electronically entered contestant information from a sweepstakes contestant for entry into a sweepstakes;
  a web server configured to:
    generate an optically machine readable (OMR) code based on the electronically entered contestant information, the OMR code corresponding to a unique index number representing the entry into the sweepstakes;
    generate a mail in address for a sweepstakes processing center based on the contestant information; and
    transmit the OMR code and the mail in address to at least one web enabled device for creating a document containing the OMR code, the document to be printed and physically mailed to the sweepstakes processing center; and
  an optical scanner configured to:
    scan the printed and physically mailed document containing the OMR code; and
    extract the unique index number for validating entry in the sweepstakes by matching the unique index number with the electronically entered contestant information, the extracted unique index number for determining in a random selection from a plurality of extracted index numbers whether the sweepstakes contestant is a winner.

2. The system of claim 1, wherein the web server is further configured to deliver web pages.

3. The system of claim 1, further comprising at least one workstation configured to generate the sweepstakes.

4. The system of claim 1, wherein the contestant information comprises a name, address, email, and cellular phone number.

5. The system of claim 1, wherein the OMR code is a bar code.

6. The system of claim 1, wherein the OMR code is a QR code.

7. The system of claim 1, wherein the index number is encrypted.

8. The system of claim 1, wherein the sweepstakes is an instant win sweepstakes.

9. The system of claim 1, wherein the sweepstakes is a scheduled sweepstakes.

10. The system of claim 1, wherein the unique index number comprises a single integer variable that increases incrementally with each sweepstakes entry.

11. A method for implementing a sweepstakes comprising:
  receiving electronically entered contestant information from a sweepstakes contestant for entry into a sweepstakes;
  generating an optically machine readable (OMR) code based on the electronically entered contestant information, the OMR code corresponding to a unique index number representing the entry into the sweepstakes;
  generating a mail in address for a sweepstakes processing center based on the contestant information;
  transmitting the OMR code and the mail in address to a web enabled device for creating a document containing the OMR code, the document to be printed and physically mailed to the sweepstakes processing center; and
  optically scanning the printed and physically mailed document containing the OMR code to extract the unique index number for validating entry in the sweepstakes by matching the unique index number with the electronically entered contestant information, the extracted unique index number for determining in a random selection from a plurality of extracted index numbers whether the sweepstakes contestant is a winner.

12. The method of claim 11, further comprising delivering at least one web page comprising sweepstakes information.

13. The method of claim 11, further comprising electronically generating the sweepstakes.

14. The method of claim 11, wherein the contestant information comprises a name, address, email, and cellular phone number.

15. The method of claim 11, wherein the OMR code is a bar code.

16. The method of claim 11, wherein the OMR code is a QR code.

17. The method of claim 11, wherein the index number is encrypted.

18. The method of claim 11, wherein the sweepstakes is an instant win sweepstakes.

19. The method of claim 11, wherein the sweepstakes is a scheduled sweepstakes.

20. The method of claim 11, wherein the unique index number comprises a single integer variable that increases incrementally with each sweepstakes entry.

* * * * *